United States Patent
Therani et al.

(10) Patent No.: US 12,294,907 B1
(45) Date of Patent: May 6, 2025

(54) METHOD OF USING SMARTPHONES TO DETERMINE A USE OF ONE OR MORE LOCATIONS AND AT LEAST ONE CRITERIA OF THE ONE OR MORE LOCATIONS

(71) Applicant: Azira LLC, Pasadena, CA (US)

(72) Inventors: Madhusadan Therani, San Jose, CA (US); Shobhit Shukla, Bangalore (IN)

(73) Assignee: Azira LLC, Pasadena, CA (US)

( * ) Notice: Subject to any disclaimer, the term of this patent is extended or adjusted under 35 U.S.C. 154(b) by 0 days.

(21) Appl. No.: 18/581,083

(22) Filed: Feb. 19, 2024

Related U.S. Application Data

(63) Continuation of application No. 17/080,706, filed on Oct. 26, 2020, now abandoned.

(51) Int. Cl.
*H04W 4/021* (2018.01)

(52) U.S. Cl.
CPC .................. *H04W 4/021* (2013.01)

(58) Field of Classification Search
CPC ..................................... H04W 4/021
USPC ..................................... 455/456.1
See application file for complete search history.

(56) References Cited

U.S. PATENT DOCUMENTS

| | | | |
|---|---|---|---|
| 6,072,461 A | 6/2000 | Haran | |
| 6,269,361 B1 | 7/2001 | Davis et al. | |
| 6,643,641 B1 | 11/2003 | Snyder | |
| 6,708,186 B1 | 3/2004 | Claborn et al. | |
| 7,092,569 B1 | 8/2006 | Kinjo | |
| 7,246,311 B2 | 7/2007 | Bargeron et al. | |
| 7,373,606 B2 | 5/2008 | Gorzela | |
| 7,379,591 B2 | 5/2008 | Kinjo | |
| 7,454,409 B2 | 11/2008 | Roy et al. | |
| 7,508,998 B2 | 3/2009 | Shiiyama | |
| 7,719,481 B2 | 5/2010 | Gormish | |
| 7,765,209 B1 | 7/2010 | Khesin et al. | |
| 7,921,187 B2 | 4/2011 | Lunati et al. | |
| 8,230,350 B2 | 7/2012 | Dodsworth | |
| 8,438,184 B1 | 5/2013 | Wang et al. | |
| 8,713,193 B1 | 4/2014 | Breau et al. | |
| 9,622,036 B1 | 4/2017 | Jintaseranee et al. | |
| 10,057,651 B1 | 8/2018 | Singh et al. | |
| 10,120,765 B1 | 11/2018 | Whitmer | |
| 10,654,658 B2 | 5/2020 | Hamaguchi | |
| 2002/0035520 A1 | 3/2002 | Weiss | |
| 2002/0046102 A1 | 4/2002 | Dohring et al. | |
| 2002/0103781 A1 | 8/2002 | Mori et al. | |
| 2003/0048272 A1 | 3/2003 | Gormish | |
| 2003/0088623 A1 | 5/2003 | Kusuda | |
| 2003/0179780 A1 | 9/2003 | Walker et al. | |
| 2004/0073520 A1 | 4/2004 | Eskandari | |

(Continued)

FOREIGN PATENT DOCUMENTS

| | | |
|---|---|---|
| JP | 2002525765 | 8/2002 |
| JP | 2003533757 | 11/2003 |

(Continued)

*Primary Examiner* — Chuck Huynh

(57) ABSTRACT

A method for determining a use of one or more locations and at least one criteria of the one or more locations using smartphones, including receiving, via a wireless network, a plurality of event data streams at different spatio-temporal resolutions from a plurality of mobile devices (e.g., at least one of the smartphones) associated with a plurality of entities, the plurality of event data streams including a plurality of unique mobile identifiers, location pings, and access pings of the plurality of mobile devices.

20 Claims, 7 Drawing Sheets

(56) References Cited

U.S. PATENT DOCUMENTS

| | | |
|---|---|---|
| 2004/0107159 A1 | 6/2004 | Heil |
| 2006/0287989 A1 | 12/2006 | Glance |
| 2007/0050251 A1 | 3/2007 | Jain et al. |
| 2007/0050252 A1 | 3/2007 | Jain |
| 2007/0050253 A1 | 3/2007 | Biggs et al. |
| 2007/0174764 A1 | 7/2007 | Roseway et al. |
| 2007/0300263 A1 | 12/2007 | Barton et al. |
| 2008/0022229 A1 | 1/2008 | Bhumkar et al. |
| 2008/0046316 A1 | 2/2008 | Shah et al. |
| 2008/0086356 A1 | 4/2008 | Glassman et al. |
| 2008/0113672 A1 | 5/2008 | Karr et al. |
| 2008/0167941 A1 | 7/2008 | Kagarlis et al. |
| 2008/0215546 A1 | 9/2008 | Baum et al. |
| 2008/0255758 A1 | 10/2008 | Graham et al. |
| 2009/0150203 A1 | 6/2009 | Baudisch et al. |
| 2009/0177758 A1 | 7/2009 | Banger et al. |
| 2009/0182589 A1 | 7/2009 | Kendall et al. |
| 2009/0234711 A1 | 9/2009 | Ramer et al. |
| 2009/0254456 A1 | 10/2009 | Sarbaev et al. |
| 2009/0287837 A1 | 11/2009 | Felsher |
| 2010/0023506 A1 | 1/2010 | Sahni et al. |
| 2010/0057560 A1 | 3/2010 | Skudlark et al. |
| 2010/0138291 A1 | 6/2010 | Silverman et al. |
| 2010/0262479 A1 | 10/2010 | Sharp |
| 2010/0325196 A1 | 12/2010 | Beckman et al. |
| 2011/0013709 A1 | 1/2011 | Lu et al. |
| 2011/0035284 A1 | 2/2011 | Moshfeghi |
| 2011/0153433 A1 | 6/2011 | Rosenberger |
| 2011/0178841 A1 | 7/2011 | Rane et al. |
| 2011/0178995 A1 | 7/2011 | Suchter et al. |
| 2011/0246457 A1 | 10/2011 | Dong et al. |
| 2011/0320423 A1 | 12/2011 | Gemmell et al. |
| 2012/0066312 A1 | 3/2012 | Kandekar et al. |
| 2012/0184292 A1 | 7/2012 | Lin et al. |
| 2012/0185458 A1 | 7/2012 | Liu et al. |
| 2012/0190380 A1 | 7/2012 | Dupray et al. |
| 2013/0031106 A1 | 1/2013 | Schechter et al. |
| 2013/0054689 A1 | 2/2013 | Woldman et al. |
| 2013/0124474 A1 | 5/2013 | Anderson |
| 2013/0152160 A1 | 6/2013 | Smith et al. |
| 2013/0246170 A1 | 9/2013 | Gross et al. |
| 2013/0267255 A1 | 10/2013 | Liu et al. |
| 2013/0298038 A1 | 11/2013 | Spivack et al. |
| 2013/0347005 A1 | 12/2013 | Lam et al. |
| 2014/0040387 A1 | 2/2014 | Spivack et al. |
| 2014/0129942 A1 | 5/2014 | Rathod |
| 2014/0279757 A1 | 9/2014 | Shimanovsky et al. |
| 2014/0304374 A1 | 10/2014 | McCue et al. |
| 2015/0073893 A1 | 3/2015 | Brown |
| 2015/0088665 A1 | 3/2015 | Karlsson |
| 2015/0149297 A1 | 5/2015 | Mahadevan et al. |
| 2015/0227851 A1 | 8/2015 | Kaisser |
| 2015/0235258 A1 | 8/2015 | Shah et al. |
| 2015/0271229 A1 | 9/2015 | Bullotta et al. |
| 2015/0327007 A1 | 11/2015 | Li |
| 2015/0345969 A1 | 12/2015 | McGavran et al. |
| 2015/0379568 A1 | 12/2015 | Balasubramanian et al. |
| 2016/0012240 A1 | 1/2016 | Smith et al. |
| 2016/0036894 A1 | 2/2016 | Collins et al. |
| 2016/0042407 A1 | 2/2016 | Els et al. |
| 2016/0055244 A1 | 2/2016 | Wang |
| 2016/0055693 A1 | 2/2016 | Somani et al. |
| 2016/0105801 A1 | 4/2016 | Wittenberg et al. |
| 2016/0117688 A1 | 4/2016 | Ghosh et al. |
| 2016/0261621 A1 | 9/2016 | Srivastava et al. |
| 2016/0350280 A1 | 12/2016 | Lavallee et al. |
| 2016/0381110 A1 | 12/2016 | Barnett et al. |
| 2016/0381155 A1 | 12/2016 | Pan et al. |
| 2017/0148050 A1 | 5/2017 | Montero et al. |
| 2017/0212894 A1 | 7/2017 | Feng et al. |
| 2017/0264719 A1 | 9/2017 | Koramutla et al. |
| 2017/0301043 A1 | 10/2017 | Soli |
| 2017/0323230 A1 | 11/2017 | Bailey et al. |
| 2017/0353477 A1 | 12/2017 | Faigon et al. |
| 2018/0032938 A1 | 2/2018 | Scriffignano et al. |
| 2018/0165723 A1 | 6/2018 | Wright et al. |
| 2018/0310274 A1 | 10/2018 | Fan et al. |
| 2019/0050874 A1 | 2/2019 | Matlick et al. |
| 2019/0102791 A1 | 4/2019 | Park et al. |
| 2019/0196795 A1 | 6/2019 | Cavalier et al. |
| 2019/0295408 A1 | 9/2019 | Wynter et al. |
| 2019/0341153 A1 | 11/2019 | Ng et al. |
| 2020/0065840 A1 | 2/2020 | Pinel et al. |
| 2020/0077282 A1 | 3/2020 | Bhorkar et al. |
| 2020/0107163 A1 | 4/2020 | Li et al. |
| 2020/0112835 A1 | 4/2020 | Li et al. |
| 2020/0141598 A1 | 5/2020 | Ahuja et al. |
| 2020/0163044 A1 | 5/2020 | Bapat et al. |
| 2020/0213865 A1 | 7/2020 | Lin et al. |
| 2020/0272676 A1 | 8/2020 | Priness et al. |
| 2020/0336400 A1 | 10/2020 | Juen et al. |
| 2020/0372006 A1 | 11/2020 | Boelderl-Ermel et al. |
| 2021/0224258 A1 | 7/2021 | Faruquie et al. |
| 2021/0258400 A1 | 8/2021 | Therani et al. |
| 2021/0258742 A1 | 8/2021 | Sakai et al. |
| 2021/0313049 A1 | 10/2021 | Khan et al. |
| 2022/0253725 A1 | 8/2022 | Feng et al. |

FOREIGN PATENT DOCUMENTS

| | | |
|---|---|---|
| JP | 2008539508 | 11/2008 |
| WO | 2000017824 | 3/2000 |
| WO | 200127847 | 4/2001 |
| WO | 2006115718 | 11/2006 |
| WO | 2009076555 | 6/2009 |
| WO | 2011116129 | 9/2011 |

METHOD OF USING SMARTPHONES TO DETERMINE A USE OF ONE OR MORE LOCATIONS AND AT LEAST ONE CRITERIA OF THE ONE OR MORE LOCATIONS

TECHNICAL FIELD

The present disclosure generally relates to inferring properties of a place, and more particularly, to a method for automatically inferring place properties based on entity spatial activity data using Bayesian models.

DESCRIPTION OF THE RELATED ART

Spatial properties are useful for analysis of various locations in metro areas and rural areas. Many business industries use a spatial property of a location or a place for decision making about their business. Existing spatial databases include only static properties of the location like addresses, a latitude or a longitude, building polygons, and a mailbox number. However, dynamic properties of the location like nature of people visiting the location, people spent time in the location, are not effectively accounted in the existing spatial databases. The dynamic properties of the location are entirely based on human activity or human mobility and other related activity at that location. Further, the dynamic properties of the location constantly evolve as human activities ebbs and flows and the overall spatial context evolves. For example, if company A's competitor moves to a similar or nearby location to company A, the company A's activity may be reduced. Similarly, if an access to a particular location is blocked, people nearby to the particular location may not visit that particular location. Traditional approaches treat these dynamic properties of the location as quasi-static and rely on ad hoc techniques to estimate these dynamic properties of the location. Furthermore, there are no generic vendors for providing these dynamic properties of the location. Current decisions are made based on ad hoc experimental data and census data which are limited in their fidelity.

With ever-increasing digitization, data relating to the human activity or the human mobility and spatial activity are encoded in a number of data formats and are further recorded and transmitted in a variety of streams. Many modern data streams of the human activity such as people on applications, wearable devices, internet of things (IOT), logistic systems, connected cars, and the like, carry time indicators, public internet protocol (IP) address (to which devices are connected), location data along with other payload data.

Approaches for estimating place properties vary across vendors and enterprises for realizing common knowledge about a place by combining the data from multiple sources. However, such fusion of the data is complex due to a presence of partial data or incorrect data and mere size of the data, which is in several gigabytes, being generated on a daily basis. This also leads to a lot of noise and fraudulence in the data. Sometimes, data sources may be on and off due to several reasons. The reasons may be outages, hardware failure, software failure, network failure, no network access, endpoint failure, intermediaries in the flow, corrupted events, blocked events, dropped events, lost event, shutdown of device, and the like. For instance, the data flow may be interrupted in airports or during prime hours when a major event is ongoing. Hence, the data may not be received in some regions or areas or time windows. Further, the multiple sources of the data may overlap that lead to duplicated event or entity counts as same people are recorded when they move around within regions, within countries, across countries. Further, some of the data sources have to be paid and some of the data sources may not be accessible. In several exemplary scenarios, the data may also be protected for maintaining privacy in some countries, and consequently, only the partial data may be available on the daily basis. This partial data is referred to as data exhaust or exhaust data, which is a trail of data left by activities of the internet or other computer system entities during their online activity, behavior, and transactions. This category of unconventional data includes geospatial information, network data, and time-series data, which may be useful for predictive purposes. An enormous amount of raw data is created, which can be in a form of cookies, temporary files, log files, storable choices, and more. A hardest piece of working with the exhaust data is getting a single holistic view around it, wherein cleaning up and unifying that data remains a challenge. The scaling and unification of these large and high-speed data streams are essential. Further, deduplication of the data streams needs to be done in real-time, as it is impossible to be done by a human being because of a sheer size of the data and shelf-life of the data.

Accordingly, there remains a need to address the aforementioned technical drawbacks in existing technologies in inferring place properties.

SUMMARY

In the view of the foregoing, an embodiment herein provides a processor-implemented method for automatically inferring one or more place properties based on partially observable entity spatial activity data using one or more data driven models. The method includes (i) obtaining, in real time, one or more event data streams associated with one or more entities from one or more independently controlled data sources at different spatio-temporal resolutions, (ii) identifying one or more locations associated with each of the one or more event data streams based on at least one of an entity context, a location context or a global context derived from the one or more event data streams, (iii) deriving at least one contextual event that affects at least one place property of the one or more locations based on at least one of (a) a spatial activity of each of the one or more entities temporally associated with the one or more locations, (b) attributes of at least one entity visiting the one or more locations using a global geo-spatial model, or (c) a weather data, (iv) automatically inferring a land-use and the at least one place property of the one or more locations based on the one or more event data streams using at least one data driven model of a place property and the at least one contextual event, and (v) re-estimating the at least one place property of the one or more locations when the one or more event data streams infer a different value for the at least one of place property of the one or more locations using the at least one data driven model. In some embodiments, the one or more event data streams include at least one of a timestamped data, a spatial data, or at least one entity identifier. In some embodiments, the one or more event data streams partially characterizes the spatial activity of each of the one or more entities temporally.

In some embodiments, at least one place property of the one or more locations includes one or more static place properties and one or more dynamic place properties. In some embodiments, the one or more static place properties include at least one of an address, a latitude, a longitude, an altitude, a building polygon, or a mailbox number. In some embodiments, the one or more dynamic place properties include at least one of (i) a frequency of human traffic, (ii) proximity of starting points of visitors, (iii) a location of the starting points of the visitors, (iv) a nature of the starting points of the visitors, (v) a stay time at a different time of a day, (vi) previous top locations and next top locations, (vii) other similar places or (viii) open spaces.

In some embodiments, the method further includes consolidating a nature of the one or more locations by aggregating or disaggregating the one or more locations with respect to one or more spatial scales. In some embodiments, the one or more locations vary from a point to a polygon.

In some embodiments, the method further includes running the at least one data driven model of the place property on a near daily basis and updating at least one metric of the at least one place property of the one or more locations for different time scales. The different time scales may be a day, a week, a month, a quarter or a year.

In some embodiments, the at least one contextual event includes at least one of a transportation dynamic, a weather dynamic, or a community dynamic.

In some embodiments, the method further comprises inferring the land-use and the at least one place property in response to incoming queries with locations and spatial regions that are not in the identified one or more locations.

In some embodiments, the at least one data driven model of the place property includes at least one of (i) a competitive analysis model, (ii) a visitor count model, (iii) a dwell time determination model, (iv) a catchment area determination model, (v) a similar places analysis model, or (vi) a place pre-post visit attribution model.

In some embodiments, the method further includes (i) extrapolating the spatial data with census data or (ii) interpolating the spatial data with the census data before downstream processing.

In some embodiments, the method further includes filtering and standardizing the one or more event data streams into a common representational format before downstream processing.

In some embodiments, the at least one data driven model uses power law effects while inferring the at least one place property of the one or more locations.

In another aspect, there is provided a system for automatically inferring one or more place properties based on partially observable entity spatial activity data using one or more data driven models. The system includes a processor and a memory that stores set of instructions, which when executed by the processor, causes to perform (i) obtaining, in real time, one or more event data streams associated with one or more entities from independently controlled data sources at different spatio-temporal resolutions, (ii) identifying one or more locations associated with each of the one or more event data streams based on at least one of an entity context, a location context or a global context derived from the one or more event data streams, (iii) deriving at least one contextual event that affects at least one place property of the one or more locations based on at least one of (a) a spatial activity of each of the one or more entities temporally associated with the one or more locations, (b) attributes of at least one entity visiting the one or more locations using a global geo-spatial model, or (c) a weather data, (iv) automatically inferring a land-use and the at least one place property of the one or more locations based on the one or more event data streams using at least one data driven model of a place property and the at least one contextual event, and (v) re-estimating the at least one place property of the one or more locations when the one or more event data streams infer a different value for the at least one of place property of the one or more locations using the at least one data driven model. In some embodiments, the one or more event data streams include at least one of a timestamped data, a spatial data, or at least one entity identifier. In some embodiments, the one or more event data streams partially characterizes the spatial activity of each of the one or more entities temporally.

In some embodiments, at least one place property of the one or more locations includes one or more static place properties and one or more dynamic place properties. In some embodiments, the one or more static place properties include at least one of an address, a latitude, a longitude, an altitude, a building polygon, or a mailbox number. In some embodiments, the one or more dynamic place properties includes at least one of (i) a frequency of human traffic, (ii) proximity of starting points of visitors, (iii) a location of the starting points of the visitors, (iv) a nature of the starting points of the visitors, (v) a stay time at a different time of a day, (vi) previous top locations and next top locations, (vii) other similar places or (viii) open spaces.

In some embodiments, the processor is further configured to consolidate a nature of the one or more locations by aggregating or disaggregating the one or more locations with respect to one or more spatial scales. In some embodiments, the one or more locations vary from a point to a polygon.

In some embodiments, the processor is further configured to run the at least one data driven model of the place property on a near daily basis and updating at least one metric of the at least one place property of the one or more locations for different time scales. The different time scales may be a day, a week, a month, a quarter or a year.

In some embodiments, the at least one contextual event includes at least one of a transportation dynamic, a weather dynamic, or a community dynamic.

In some embodiments, the processor is further configured to infer the land-use and the at least one place property in response to incoming queries with locations and spatial regions that are not in the identified one or more locations.

In some embodiments, at least one data driven model of the place property includes at least one of (i) a competitive analysis model, (ii) a visitor count model, (iii) a dwell time determination model, (iv) a catchment area determination model, (v) a similar places analysis model, or (vi) a place pre-post visit attribution model.

In some embodiments, the processor is further configured to (i) extrapolate the spatial data with census data or (ii) interpolate the spatial data with the census data before downstream processing.

In some embodiments, the processor is further configured to filter and standardize the one or more event data streams into a common representational format before downstream processing.

In yet another aspect, there is provided one or more non-transitory computer-readable storage mediums storing the one or more sequences of instructions, which when executed by the one or more processors, causes to perform a method for automatically inferring one or more place properties based on partially observable entity spatial activity data using one or more data driven models.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
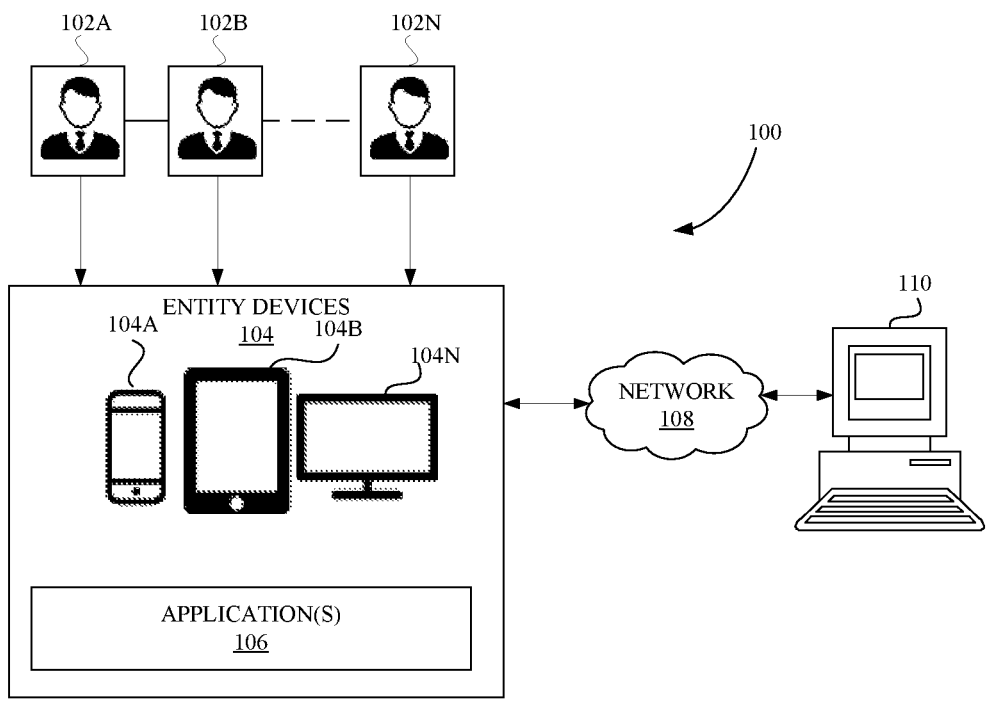
FIG. 1 is a block diagram that illustrates a system for automatically inferring one or more place properties based on partially observable entity spatial activity data using one or more data driven models, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method that supports scale, frequent changes and has an ability to adjust with partial data for automatically inferring one or more place properties based on entity spatial activity data. Referring now to the drawings, and more particularly to FIGS. 1 through 7, where similar reference characters denote corresponding features consistently throughout the figures, there are shown preferred embodiments.

The term "independently controlled data sources" refers to any source that may control or standardize different aspects of data streams. The different aspects include, but is not limited to, 1) a type of data that needs to be collected, 2) a time and location, the data needs to be collected, 3) a data collection method, 4) modification of collected data, 5) a portion of data to be revealed to public, 6) a portion of data to be protected, 7) a portion of data can be permitted by a consumer or user of an application or a device, and 8) a portion of data to be completely private.

A single real-world event may be tracked by different independently controlled data sources. Alternatively, data from the different independently controlled data sources may be interleaved to understand an event or a sequence of events. For example, consider a consumer using multiple applications on his android phone, as he or she interacts with each application, multiple independent streams of events may be produced. Since, each application becomes an independent data source. Events and users may have different identifiers across different applications depending on how the application is implemented. Additionally, if one were to monitor a network, each application-level event may generate additional lower-level network events.

The term "partial observable data or partial data" refers to a data stream where all the events are not captured due to several reasons. The terms "location" and "place" may be used inter-changeably and refer to a geographic location such as a locality, a sub locality, an establishment, a geocode or an address.

In an exemplary embodiment, various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one of digital signals or analog signals for performing various functions as described herein.

FIG. 1 is a block diagram that illustrates a system 100 for automatically inferring one or more place properties based on partially observable entity spatial activity data using one or more data driven models, according to some embodiments herein. The system 100 includes one or more entity devices 104A-N that are associated with one or more entities 102A-N and a place profiling server 110. The one or more entity devices 104A-N are communicatively connected with the place profiling server 110 via a network 108. In some embodiments, the one or more entity devices 104A-N are one or more independently controlled data sources. The one or more entity devices 104A-N includes, but not limited to, personal computers, mobile devices, smartphones, tablets, smartwatches, IoT devices, connected vehicles, or other computing devices. The one or more entity devices 104A-N include one or more applications 106 that in turn acts as the one or more independently controlled data sources. The one or more applications 106 may include, but not limited to, a browser application, a mobile application, a type of application that communicates with one or more systems, or an application that can collect behavior of an entity. In one embodiment, the network 108 includes a wireless network, a wired network, or a combination of the wired network and the wireless network and the like.

The place profiling server 110 obtains, in real-time, one or more event data streams associated with the one or more entities 102A-N from the one or more independently controlled data sources at different spatio-temporal resolutions. The place profiling server 110 identifies one or more locations associated with each of the one or more event data streams based on at least one of an entity context, a location context or a global context derived from the one or more event data streams. The place profiling server 110 derives one or more contextual events that affect at least one place property of the one or more locations based on at least one of (i) a spatial activity of each of the one or more entities 102A-N temporally associated with the one or more locations, (ii) attributes of the one or more entities 102A-N visiting the one or more locations using a global geo-spatial model, or (iii) a weather data. The place profiling server 110 automatically infers a land-use and the at least one place property of the one or more locations based on the one or more event data streams using one or more data driven models of a place property and the one or more contextual events using bayesian update models. The place profiling server 110 re-estimates the at least one place property of the one or more locations when the one or more event data streams infer a different value for the at least one place property of the one or more locations using the one or more data driven models.

In some embodiments, the one or more event data streams are partial data. The one or more event data streams include at least one of a timestamped data, a spatial data, an internet protocol (IP) address, at least one entity identifier, or other payload information. The one or more event data streams partially characterizes the spatial activity of each of the one or more entities 102A-N temporally. In some embodiments, the spatial data includes a latitude data and a longitude data. Optionally, the one or more event data streams include non-location indexed data. The non-location indexed data may include IP information. Optionally, the one or more event data streams include (i) location pings from the one or more applications 106 engaged on the one or more entity devices 104A-N, (ii) access pings from wireless hot-spots, (iii) active subscriber's data and location in different geo-areas from a mobile network, and (iv) a location information from traffic sensors or a public CCTV camera for security and others. The one or more event data streams may include digital visit counts to a global website and social media activities. The one or more event data streams may include census data. In some embodiments, the place profiling server 110 obtains the census related data from a global census database. The place profiling server 110 may obtain the census related data from third party sources.

In some embodiments, the one or more event data streams include attributes of the one or more of the entities 102A-N. The attributes of the one or more of the entities 102A-N may include at least one of a countable attribute, a categorical attribute, an ordinal attribute, a location, a spatial attribute, or a temporal behavior of an entity. The countable attribute may include at least one of (i) spend levels, or (ii) a frequency of visits. The categorical attribute may include at least one of (i) a gender, (ii) age-groups, (iii) a content, or (iv) a content type. The spatial attribute may include at least one of (i) residential areas, (ii) regions of interest, or (iii) place categories. In In some embodiments, the place profiling server 110 communicatively coupled with an adaptive location assignment system that assigns real-time location for non-location index data streams that include the IP address. The adaptive location assignment system may assign real-time location for the IP address using machine learning from location indexed one or more event data streams that are obtained from the one or more independently controlled data sources.

In some embodiments, the one or more event data streams include human mobility data. The human mobility data refers to the spatial activity data that is associated with an individual. For the one or more entities 102A-N, data may be obtained for their activities on a daily basis in the place profiling server 110.

In some embodiments, the at least one entity identifier is unique for each of the one or more entity devices 104A-N or for each of the one or more independently controlled data sources. In some embodiments, the at least one entity identifier is a unique device identifier. The at least one entity identifier may include, but is not limited to, an Identifier for Advertisers (IDFA), an Android Advertising Identifier (AAID), in-app Advertising ID, Cookie ID, Mac IDs, and Publisher-specific ID schemes.

In some embodiments, the place profiling server 110 validates the at least one entity identifier associated with the one or more event data streams. The place profiling server 110 checks if the IDFA or AAID associated with the one or more event data streams is in a database or not. If the at least one entity identifier is present in the database, the place profiling server 110 checks in the database if the at least one entity identifier has been come across in the past. For example, if the cookie received is new or too old in the past, then it is stale. In some embodiments, if the received cookie history exists then the cookie is checked for historical behaviors. In some embodiments, the place profiling server 110 may even check national rage of IP's to determine if the entity is spanning the country or spanning a globe.

In an embodiment, the place profiling server 110 may deduplicate two places that are same in the one or more event data streams. Further, the place profiling server 110 may perform deduplication of the one or more event data streams at a large scale. The one or more event data streams may include data streams associated with the one or more entities 102A-N at a scale of a million.

In an embodiment, an output comprising one or more place properties is provided by the place profiling server 110 when an input query is received at the place profiling server 110. The output may include property such as a pre location of an entity that visits the place, a post location of an entity who visits the place, dwell time of the entity at the place and attributes associated with a unique entity identifier of the user. The pre-location is a geographic location on a map from where the one or more entities 102A-N are visiting (for example a residential, office or other locations). The post location is the geographic location from where the one or more entities 102A-N are visiting (for example a residential, office or other locations). Further, the place profiling server 110 may provide another output that include a variation of the set of output property over a period of time.

The one or more place property that may be inferred by the place profiling server 110 includes a number of entities visiting the place in a time window, pre-location from where the one or more entities 102A-N are visiting (for example a residential, office or other locations), previous top locations and next top locations, time spent at a place, a dwell time at different times of the day, an identification of different place that shares a similarity with the place, relationship to other types of places, motifs of commonality, and an identification of open spaces where no locations of a given category exist. Relating to the spatial activity of each of the one or more of entities 102A-N, the previous top location may refer to a one or more previous locations that have been visited most by the one or more entities 102A-N before visiting the one or more locations and the next top locations may refer to a one or more next locations of that have been visited most by the one or more entities after visiting the one or more locations.

Figure 2:
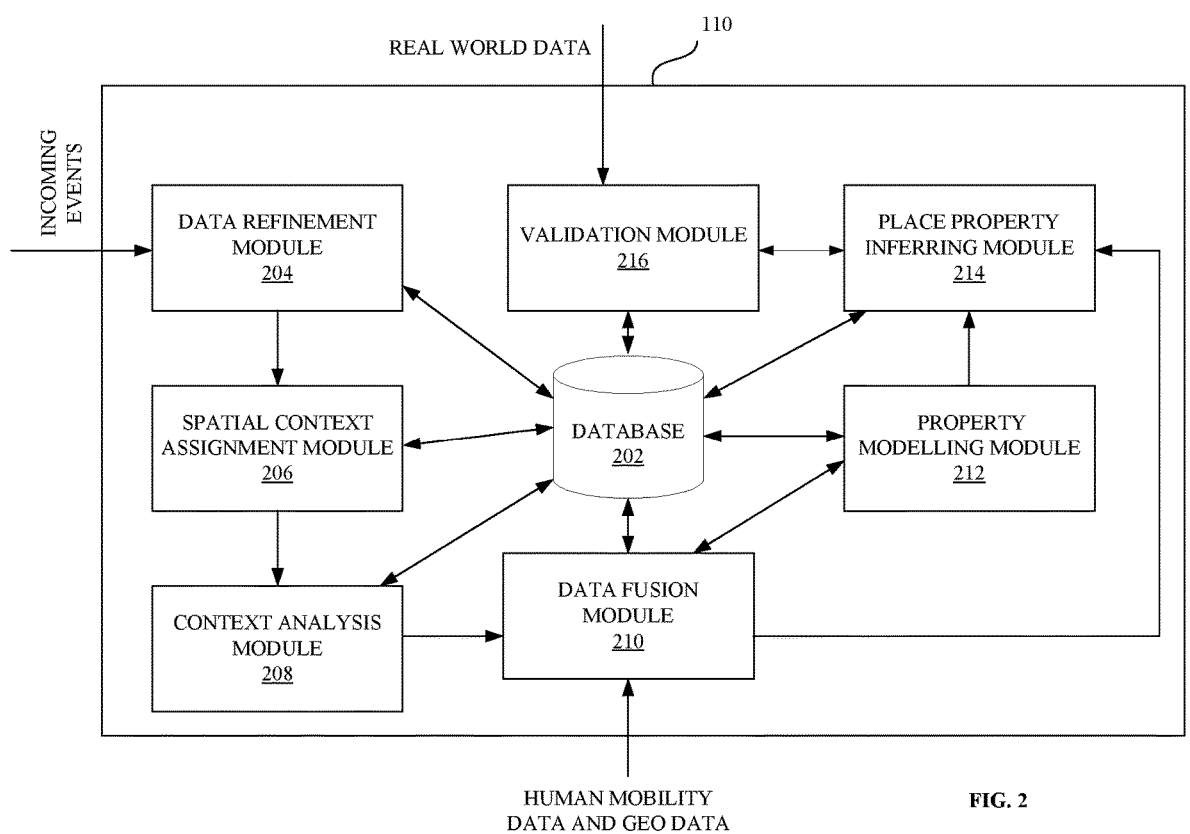
FIG. 2 is a block diagram of a place profiling server of FIG. 1, according to some embodiments herein.

FIG. 2 is a block diagram of a place profiling server 110 of FIG. 1 according to some embodiments herein. The place profiling server 110 includes a database 202, a data refinement module 204, a spatial context assignment module 206, a context analysis module 208, a data fusion module 210, a property modelling module 212, a place property inferring module 214 and a validation module 216. The data refinement module 204 receives the one or more event data streams associated with the one or more entities 102A-N from the one or more independently controlled data sources at different spatio-temporal resolutions. In some embodiments, the data refinement module 204 checks if the at least one entity identifier associated with the one or more event data streams is a part of do not profile list which constrains the place profiling server 110 from creating a profile due to a privacy management rule associated with the place profiling server 110. In some embodiments, the at least one entity identifier is validated across the one or more independently controlled data sources of the one or more event data streams to check if behavior of the one or more entities 102A-N is consistent. For example, location tags for entity identifier associated with an entity from two independent data sources need to be near or close to each other in a reasonable manner. In some embodiments, the one or more event data streams are compared with a history associated with the at least one entity identifier to identify anomaly in the one or more event data streams periodically. In some embodiments, the one or more event data streams includes a unique entity identifier, the timestamped data and a location indexed data, that partially characterizes an activity of the one or more entities 102A-N associated with the unique entity identifier. In some embodiments, the one or more event data streams with the unique entity identifier are obtained from the one or more entity devices 104A-N engaged with at least one of (i) the one or more application 106, (ii) a wireless network, or (iii) a mobile network. In some embodiments, the data refinement module 204 obtains the one or more event data streams in real-time from the one or more entity devices 104A-N over the network 108.

The spatial context assignment module 206 identifies the one or more locations associated with each of the one or more event data streams based on at least one of the entity context, the location context or the global context derived from the one or more event data streams. The spatial context assignment module 206 may determine the one or more locations using the spatial data that is associated with the one or more event data streams. The spatial context assignment module 206 may determine the one or more locations using an IP to location map that is generated by the adaptive location assignment system.

The context analysis module 208 derives the one or more contextual events that affect the at least one place property of the one or more locations based on at least one of (i) the spatial activity of each of the one or more entities 102A-N temporally associated with the one or more locations, (ii) the attributes of the one or more entities 102A-N visiting the one or more locations using the global geo-spatial model, or (iii) the weather data. The attributes associated with the unique entity identifier may include human traffic data and geo data. The context analysis module 208 may derive the one or more contextual events using one or more bayesian update models. The geo-spatial model is a digital model of the real world that may be obtained from a third-party. The geo-spatial model may comprise one or more statistical areas that are bounded by visible features such as roads, streams, and railroad tracks, and by nonvisible boundaries such as property lines, city, township, school district, county limits and short line-of-sight extensions of roads. Data associated with a plurality of block level data may be aggregated and dis-aggregated based on the place. In some embodiments, human mobility data and geo data may be combined with the geo-spatial model.

The data fusion module 210 combines non-location indexed data with the one or more contextual events by performing one or more data fusion methods. In some embodiments, the one or more data fusion methods may include a complementary fusion, a redundant fusion or a cooperative fusion. The one or more event data streams may include non-location indexed data. The non-location indexed data may include IP information. Optionally, the one or more event data streams includes (i) location pings from one or more applications 106 engaged on the one or more entity devices 104A-N, (ii) access pings from wireless hot-spots, (iii) active subscriber's data & location in different geo-areas from the mobile network, and (iv) the location information from the traffic sensors or the public CCTV camera for security and others.

The property modelling module 212 generates the one or more data driven models of the place property based on the one or more event data streams of the spatial activity associated with the one or more locations. The property modelling module 212 consolidates a nature of the one or more locations with respect to the one or more spatial scales by aggregating one or more sub-places to the place or disaggregating the place to a plurality of sub-places. The sub-place exists inside an area of the place and may be considered as an individual place. The nature of the one or more locations may be stored in the database 202.

The property inferring module 214 automatically infers the land-use and the one or more place properties of the one or more locations based on the one or more event data streams using the one or more data driven models of the place property and the one or more contextual events. The place property inferring module 214 may automatically infer a land-use and a spatial property of the place based on the one or more data driven models and the one or more contextual events using bayesian update models. The land-use and one or more place properties of the one or more locations are stored in the database 202.

The validation module 216 re-estimates the one or more place properties of the one or more locations when the plurality of data streams infers a different value for at least one of the spatial property of the place using a Bayesian update model. The validation module 216 may refine the one or more event data streams by (i) validating one or more dimensions of the one or more event data streams, (ii) filtering spurious or fraudulent events associated with the one or more event data streams, and (iii) correcting errors and aligning different source streams into a common minimally viable representation. In some embodiments, the one or more dimensions of the one or more event data streams include (i) a time dimension, (ii) a spatial dimension, (iii) a trajectory behavior, (iv) an entity identifier, (v) a content or application category. Optionally, the validation module 216 refines the one or more event data streams by validating the one or more dimensions of the one or more event data streams and checking consistency of the one or more dimensions of the one or more event data streams with historical behavior like 30 days behavior. In some embodiments, the validation module 216 validates the time dimension associated with the one or more event data streams by (i) analyzing a number of concurrent data event streams from a single entity for a selected time, (ii) bucketing the one or more event data streams based on the category of the time zone i.e. morning, daytime, afternoon, evening, night time, holiday, weekday or a weekend, and (iii) filtering too many concurrent data event streams from the single entity for the selected time. For example, too many concurrent data event streams from the single entity at the same time cannot be bursty event. In some embodiments, the one or more event data streams is bucketed based on country-wise time zones. The time dimension associated with the one or more event data streams is validated based on standardized country time zones. For example, the time dimension associated with the one or more event data streams of an entity should match with time zone of the country of the entity, if known. In some embodiments, the validation module 216 validates the spatial dimension associated with the one or more event data streams by analyzing at least one of (i) the IP address, (ii) the latitude and the longitude, (iii) a country type (home country or travel country), (iv) a network type, (v) decimal to geohash error range, (vi) a network source type, (vii) a gridding structure, (viii) a trajectory behavior, (ix) any big data platform associated with the one or more event data streams, (x) the land use, (xi) a trajectory speed, (xii) consecutive pings physical validity. In some embodiments, the spatial dimension of the entity is validated based on whether the entity is in a home country or a travel country and whether the entity is using a home network or a travel network. In some embodiments, the spatial dimension of the entity is validated based on its occurrence. For example, if a ping identifies entity locations to be in a country "X" and the next immediate ping identifies the entity locations to be in country "Y" across another continent which would physically be not valid. In such an instance, place profiling server 110 would treat the ping invalid.

In an embodiment, the place profiling server 110 may provide consolidated data about one or more place properties. The one or more place properties may be continuously updated and may reflect the latest available sources.

Figure 3:
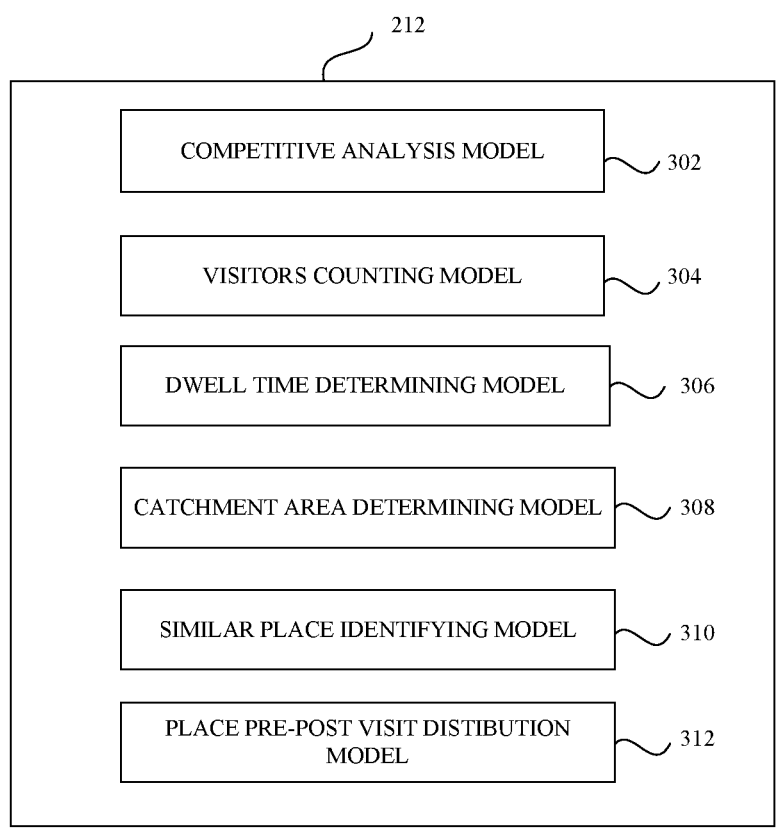
FIG. 3 is a block diagram of a property modelling module of FIG. 2, according to some embodiments herein.

FIG. 3 is a block diagram of a property modelling module 212 of FIG. 2, according to some embodiments herein. The property modelling module 212 generates the one or more data driven models of the place property based on the one or more data streams of the spatial activity associated with the one or more locations. The place property inferring module 214 infers the land-use and the one or more place properties of the one or more locations based on the one or more event data streams using the one or more data driven models of the place property that are generated by the property modelling module 212. The one or more data driven models may include, but are not limited to, a competitive analysis model 302, a visitors counting model 304, a dwell time determining model 306, a catchment area determining model 308, a similar place identifying model 310 and a place pre-post visit distribution model 312. The competitive analysis model 302 may be used to perform a competitive analysis between the one or more locations. The visitors counting model 304 may be used to identify a visit count of the one or more entities 102A-N for the one or more locations. The dwell time determining model 306 may be used to determine a time spent by the one or more entities 102A-N when they visit the one or more locations. The catchment area determining model 308 may be used to determine a catchment area associated with the one or more locations, where the catchment area is an area from the one or more locations that attract the one or more entities 102A-N by utilizing a service associated with the one or more locations. The similar place identifying model 310 may be used to identify a similar place that has characteristics similar to the one or more locations. The place pre-post visit distribution model 312 may be used to determine a number of entities visiting a place in a time window, the location from where the one or more entities 102A-N are visiting (for example a residential, office or other locations), the previous top locations and the next top locations, the time spent at the place, the dwell time at different times of the day, different places that share a similarity with the place, relationship to other types of places, motifs of commonality, and an identification of open spaces where no locations of a given category exist.

In some embodiments, the one or more data driven models may handle power-law effects, using sampling and extrapolation to infer the one or more place properties of the one or more locations. Further, the inferred one or more place properties may be validated with real-world data when the real-world data is available.

In some embodiments, the place profiling server 110 when profiles a new location, the respective data driven models that infer the one or more place properties of the new location may take a duration of three to four weeks to stabilize. This is known as a cold start. A quality of prediction of the one or more place properties increases as the time progresses and makes the place profiling server 110 adaptive.

The one or more data driven models may be run on the near daily basis and the one or metrics that relate to the one or more place properties are also updated. The one or more metrics may be updated for different time scales such as the day, the week, the month, the quarter or the year. Further, the one or more place properties may be computed for a set of pre-defined locations.

In an exemplary embodiment, if there is a social event that is happening in Manhattan, the place profiling server 110 may detect the social event. The one or more place property such as a number of people visiting a place, increase in dwell times, or traffic jams in Manhattan is observed to spike, may be detected by the place profiling server 110 anonymously.

Figures 4A, 4B:
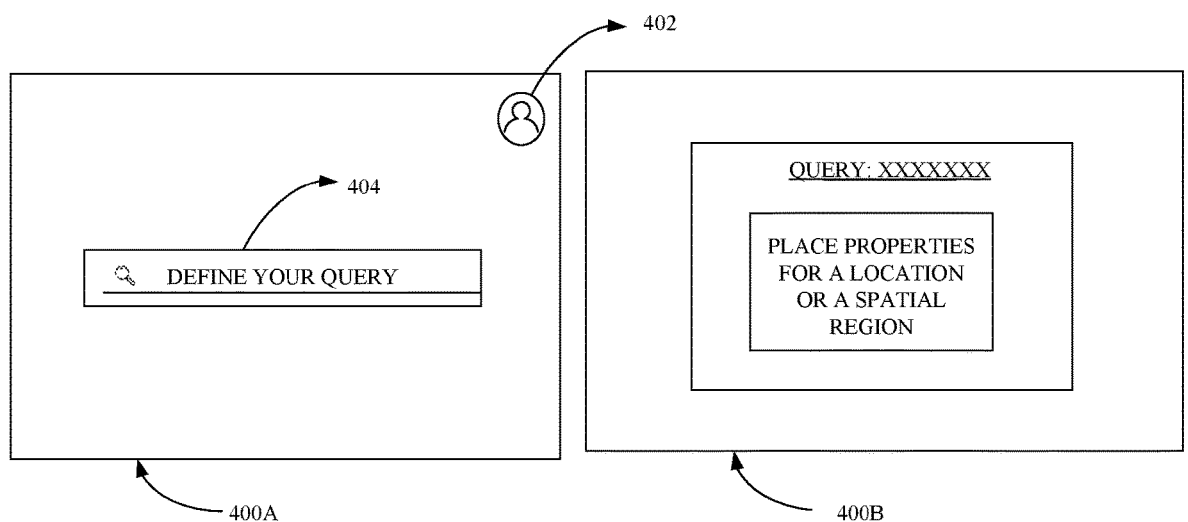
FIGS. 4A and 4B are exemplary user interface views of a place profiling server of FIG. 1, according to some embodiments herein.

FIGS. 4A and 4B are exemplary user interface views of a place profiling server 110 of FIG. 1, according to some embodiments herein. In some embodiments, the one or more place properties may be computed in response to an incoming query for the one or more locations or a spatial region. FIG. 4A illustrates an exemplary user interface view 400A of a home page of the place profiling server 110, according to some embodiments herein. The exemplary user interface view 400A includes a login interface 402 and a query defining space 404. The login interface 402 enables a user to login to the place profiling server 110 by providing a user identifier and a password. The query defining space 404 enables the user to define a query in a natural language upon login to the place profiling server 110. The query may include the geographic location such as a locality, a sub locality, an establishment, a geocode or an address.

FIG. 4B illustrates an exemplary user interface view 400B of a result page of the place profiling server 110, according to some embodiments herein. The exemplary user interface view 400B provides a response to the query provided by the user. The response includes one or more place properties associated with the one or more locations that are associated with the query. The one or more place properties may be computed in response to the incoming query for the one or more locations and the spatial region that is not in the database 202.

Figure 5:
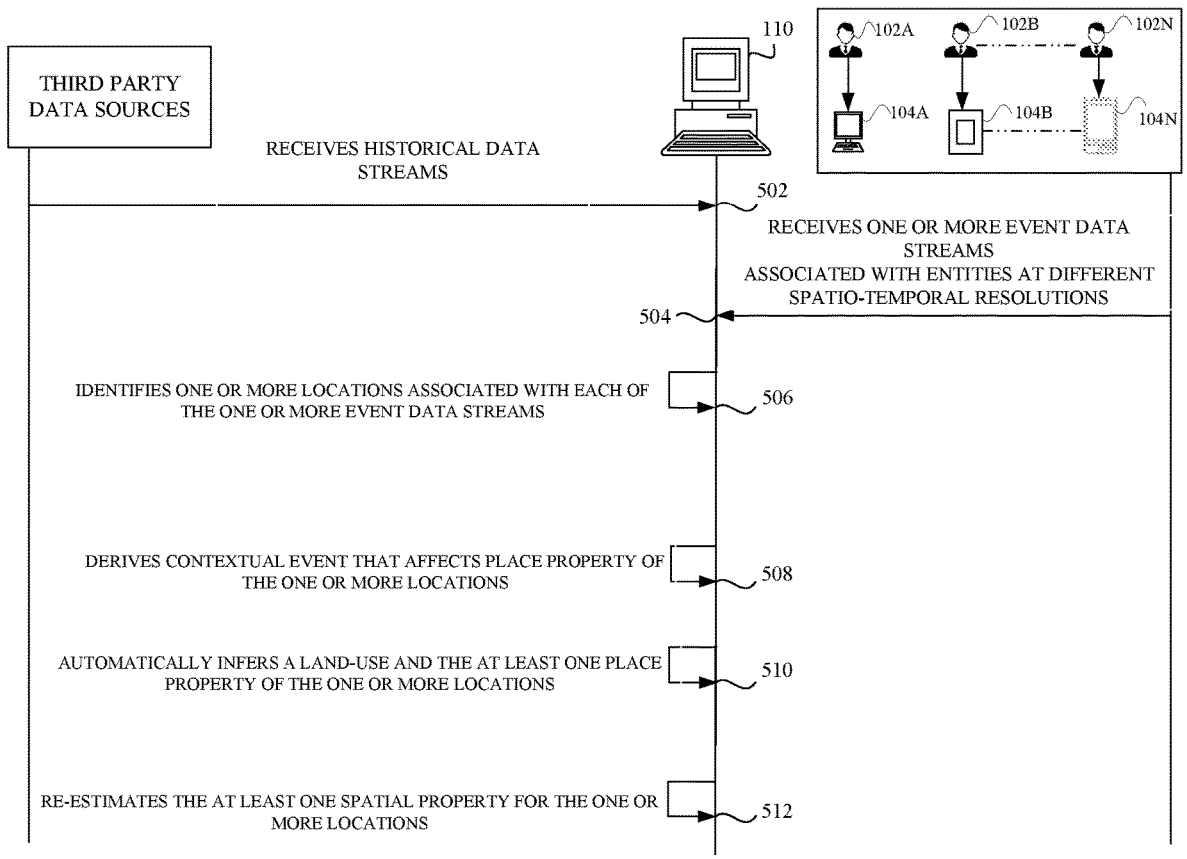
FIG. 5 is an interaction diagram that illustrates a method for automatically inferring one or more place properties based on partially observable entity spatial activity data using one or more data driven models, according to some embodiments herein.

FIG. 5, with reference to FIG. 1, is an interaction diagram that illustrates a method for automatically inferring the one or more place properties based on the partially observable entity spatial activity data using the one or more data driven models, according to some embodiments herein. At a step 502, historical data streams from one or more third-party data sources are received. In some embodiments, the one or more third-party data sources include, but is not limited to, Xmode®, Cuebiq®, and similar other vendors. The historical data streams may include IP addresses along with a latitude information and a longitude information sourced from geo-location to IP vendors. At a step 504, the one or more event data streams associated with the one or more entities 102A-N are obtained from the one or more independently controlled data sources at different spatio-temporal resolutions. The one or more event data streams include at least one of the timestamped data, the spatial data or the at least one entity identifier. The one or more event data streams partially characterize the spatial activity of each of the one or more entities 102A-N temporally. The one or more independently controlled data sources may be the one or more entity devices 104A-N. In some embodiments, the one or more event data streams may be validated based on the historical data streams. At a step 506, the one or more locations associated with each of the one or more event data streams are identified based on at least one of the entity context, the location context, or the global context derived from the one or more event data streams. At a step 508, the at least one contextual event that affects the at least one place property of the one or more locations is derived based on at least one of (i) the spatial activity of each of the one or more entities 102A-N temporally associated with the one or more locations, (ii) the attributes of the at least one entity visiting the one or more locations using the global geo-spatial model or (iii) the weather data. At a step 510, the land-use and the at least one place property of the one or more locations are automatically inferred based on the one or more event data streams using the at least one data driven model of the place property and the at least one contextual event. At a step 512, the at least one place property of the one or more locations is re-estimated when the one or more event data streams infer a different value for the at least one of spatial property of the one or more locations using the at least one data driven model.

Figure 6:
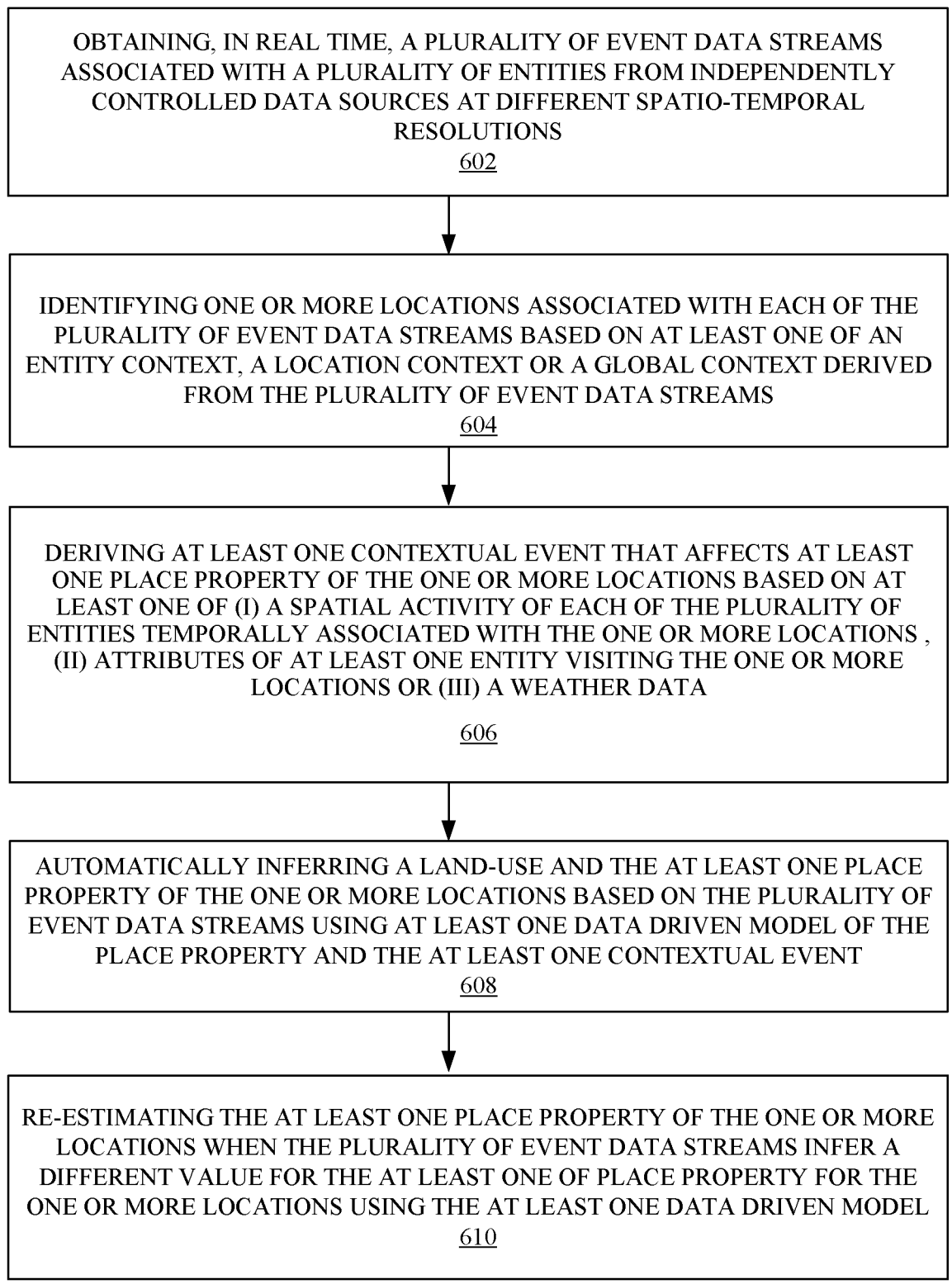
FIG. 6 is a flow chart that illustrates a method for automatically inferring one or more place properties based on partially observable entity spatial activity data using one or more data driven models, according to some embodiments herein.

FIG. 6, with reference to FIG. 1, is a flow chart that illustrates a method for automatically inferring the one or more place properties based on the partially observable entity spatial activity data using the one or more data driven models, according to some embodiments herein. At a step 602, the one or more event data streams associated with the one or more entities 102A-N are obtained from the one or more independently controlled data sources at different spatio-temporal resolutions. The one or more event data streams include at least one of the timestamped data, the spatial data or the at least one entity identifier. The one or more event data streams partially characterize the spatial activity of each of the one or more entities 102A-N temporally. The one or more independently controlled data sources may be the one or more entity devices 104A-N. At a step 604, the one or more locations associated with each of the one or more event data streams are identified based on at least one of the entity context, the location context, or the global context derived from the one or more event data streams. At a step 606, the at least one contextual event that affects the at least one place property of the one or more locations is derived based on at least one of (i) the spatial activity of each of the one or more entities 102A-N temporally associated with the one or more locations, (ii) the attributes of the at least one entity visiting the one or more locations using the geo-spatial model of real-world or (iii) the weather data. At a step 608, the land-use and the at least one place property of the one or more locations are automatically inferred based on the one or more event data streams using at least one data driven model of the place property and the at least one contextual event. At a step 610, the at least one place property of the one or more locations is re-estimated when the one or more event data streams infer a different value for the at least one of place property of the one or more locations using the at least one data driven model.

In some embodiments, the at least one place property of the one or more locations comprises the one or more static place properties and the one or more dynamic place properties. The one or more static place properties may include at least one of the address, the latitude, the longitude, the altitude, the building polygon, or the mailbox number. The one or more dynamic place properties may include at least one of (i) the frequency of human traffic, (ii) the proximity of starting points of visitors, (iii) the location of the starting points of the visitors, (iv) the nature of the starting points of the visitors, (v) the stay time at a different time of a day, (vi) the previous top locations and the next top locations, (vii) other similar places, or (viii) open spaces.

In some embodiments, the method further includes consolidating the nature of the one or more locations by aggregating or disaggregating the one or more locations with respect to one or more spatial scales. The one or more locations vary from the point to the polygon.

In some embodiments, the method further includes running the at least one data driven model of the place property on the near daily basis and updating the at least one metric of the at least one place property of the one or more locations for different time scales. The different time scales may include the day, the week, the month, the quarter, or the year.

In some embodiments, the at least one contextual event includes at least one of the transportation dynamic, the weather dynamic, or the community dynamic.

In some embodiments, the method further includes inferring the land-use and the at least one place property in response to the incoming queries with the locations and the spatial regions that are not in the identified one or more locations.

In some embodiments, the at least one data driven model of the place property includes at least one of (i) the competitive analysis model, (ii) the visitor count model, (iii) the dwell time determination model, (iv) the catchment area determination model, (v) the similar places analysis model, or (vi) the place pre-post visit attribution model.

In some embodiments, the method further includes (i) extrapolating the spatial data with the census data or (ii) interpolating the spatial data with the census data before downstream processing.

In some embodiments, the method further includes filtering and standardizing the one or more event data streams into the common representational format before downstream processing.

In some embodiments, the method further includes the at least one data driven model uses power law effects while inferring the at least one place property of the one or more locations.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include at least one of tangible or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
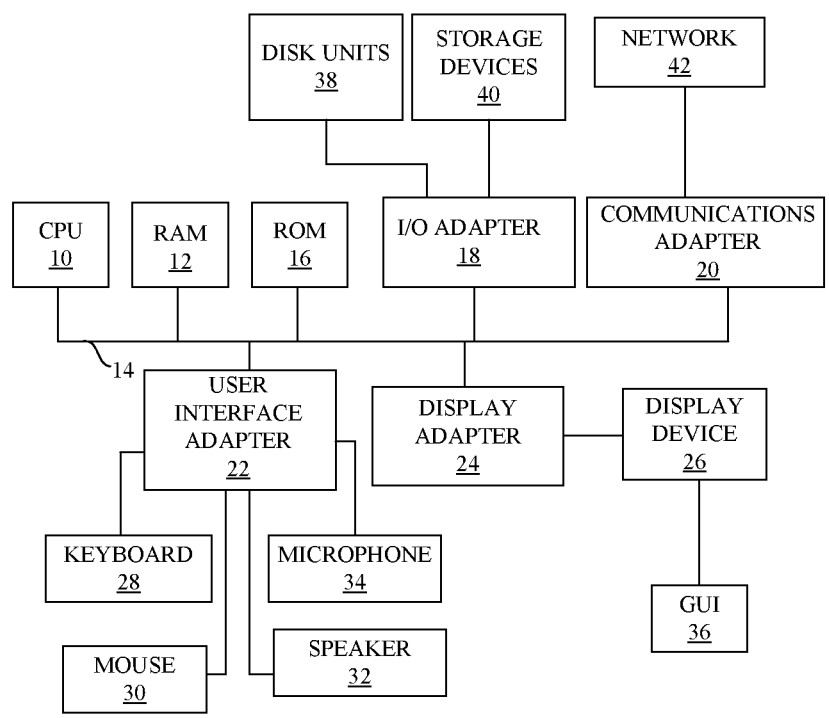
FIG. 7 is a schematic diagram of an entity device or a place profiling server used in accordance with the embodiments herein.

A representative hardware environment for practicing the embodiments herein is depicted in FIG. 7, with reference to FIGS. 1 through 6. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects at least one of a keyboard 18, mouse 19, speaker 25, microphone 23, or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for determining a use of one or more locations and at least one criteria of the one or more locations using smartphones, comprising:
receiving, by a server via a wireless network, a plurality of event data streams at different spatio-temporal resolutions from a plurality of mobile devices associated with a plurality of entities, the mobile devices comprising at least one of the smartphones, the plurality of event data streams including a plurality of unique mobile identifiers, location pings, and access pings of the plurality of mobile devices;
verifying, by the server, the plurality of event data streams by determining whether the plurality of unique mobile identifiers are present within a database;
identifying, by the server, one or more locations associated with each of the plurality of event data streams based on the location pings and the access pings included in the plurality of event data streams, the one or more locations including a plurality of static criterias and a plurality of dynamic criterias;
determining, by the server, a spatial activity of each of the plurality of entities temporally associated with the one or more locations and criterias of at least one entity visiting the one or more locations using a global geo-spatial model to derive at least one contextual event that affects the at least one criteria of the one or more locations;
generating, by the server, at least one data driven model of the at least one criteria based on the spatial activity of each of the plurality of entities temporally associated with the one or more locations; and
determining, by the server, the use of the one or more locations and the at least one criteria of the one or more locations based on the plurality of event data streams using the at least one data driven model and the at least one contextual event.

2. The method of claim 1, wherein the verifying, by the server, the plurality of event data streams comprises verifying a time dimension associated with the one or more of the plurality of event data streams by analyzing a number of concurrent data event streams from a single entity for a selected time; and filtering concurrent data event streams from the single entity for the selected time.

3. The method of claim 1, wherein the plurality of static criterias comprise at least one of a location, a latitude, a longitude, an altitude, a building shape, or a mailbox number, wherein the plurality of dynamic criterias comprise at least one of a frequency of traffic, proximity of starting points of guests, and a location of the starting points of the guests.

4. The method of claim 1, wherein the plurality of static criterias comprise at least one of a location, a latitude, a longitude, an altitude, a building shape, or a mailbox number, wherein the plurality of dynamic criterias comprise at least one of a nature of the starting points of the guests and a stay time at a different time of a day.

5. The method of claim 1, wherein the plurality of static criterias comprise at least one of a location, a latitude, a longitude, an altitude, a building shape, or a mailbox number, wherein the plurality of dynamic criterias comprise at least one of a previous top locations and next top locations, other places, and open spaces.

6. The method of claim 1, further comprising: centralizing a nature of the one or more locations by decollecting the one or more locations with respect to one or more spatial scales, wherein the one or more locations range from a point to a shape.

7. The method of claim 1, further comprising: centralizing a nature of the one or more locations by collecting the one or more locations with respect to one or more spatial scales, wherein the one or more locations range from a point to a shape.

8. The method of claim 1, further comprising: running the at least one data driven model of the at least one criteria of the one or more locations on a basis and updating at least one metric of the at least one criteria of the one or more locations for different time scales, wherein the different time scales comprise at least one day.

9. The method of claim 1, wherein the plurality of event data streams further include non-location data may comprising at least one of IP information, location pings, access pings, and subscriber data.

10. The method of claim 1, further comprising: determining the use of the one or more locations and the at least one criteria of the one or more locations in response to incoming queries with the one or more locations and spatial regions that are not in the one or more locations that are identified.

11. The method of claim 1, wherein the at least one data driven model of the at least one criteria of the one or more locations comprises a competitive analysis model.

12. The method of claim 1, wherein the at least one data driven model of the at least one criteria of the one or more locations comprises a guest count model.

13. The method of claim 1, wherein the at least one data driven model of the at least one criteria of the one or more locations comprises a linger time determination model.

14. The method of claim 1, wherein the at least one data driven model of the at least one criteria of the one or more locations comprises a catchment area determination model.

15. The method of claim 1, wherein the at least one data driven model of the at least one criteria of the one or more locations comprises a places analysis model.

16. The method of claim 1, wherein the at least one data driven model of the at least one criteria of the one or more locations comprises a place pre-post credit model.

17. The method of claim 1, wherein the method further comprises re-estimating the at least one criteria of the one or more locations when the plurality of event data streams determine a different value for the at least one criteria of the one or more locations using the at least one data driven model.

18. The method of claim 17, further comprising: extrapolating the spatial data with census data.

19. The method of claim 17, further comprising: interpolating the spatial data with the census data before downstream processing.

20. The method of claim 1, further comprising: filtering and standardizing the plurality of event data streams into a common representational format before downstream processing.

* * * * *